No. 866,009. PATENTED SEPT. 17, 1907.
W. I. DREISBACH.
TIRE.
APPLICATION FILED SEPT. 15, 1906.

2 SHEETS—SHEET 1.

Witnesses
Howard D. Orr
B. G. Foster

Inventor,
William I. Dreisbach,
By E. G. Siggers
Attorney

No. 866,009. PATENTED SEPT. 17, 1907.
W. I. DREISBACH.
TIRE.
APPLICATION FILED SEPT. 15, 1906.

2 SHEETS—SHEET 2.

Witnesses
Howard N. Orr
B. G. Foster

William I. Dreisbach, Inventor,
By E. G. Siggers
Attorney

UNITED STATES PATENT OFFICE.

WILLIAM IRVIN DREISBACH, OF WILLIAMSPORT, PENNSYLVANIA.

TIRE.

No. 866,009.  Specification of Letters Patent.  Patented Sept. 17, 1907.

Application filed September 15, 1906. Serial No. 334,758.

*To all whom it may concern:*

Be it known that I, WILLIAM IRVIN DREISBACH, a citizen of the United States, residing at Williamsport, in the county of Lycoming and State of Pennsylvania, have invented a new and useful Tire, of which the following is a specification.

This invention relates more particularly to pneumatic tires for automobiles and like vehicles, and the principal object is to produce a tire that can be cheaply manufactured, is light and resilient, and has great powers for resisting the passage of articles, such as nails, and the like, that are apt to puncture the air tube, and permit the escape of air.

Another important object is to provide a novel tire, which is so constructed that if the casing or tread is badly cut, the inner tube will be tightly bound, and so-called "blow-outs" thus prevented.

The preferred form of construction is illustrated in the accompanying drawings, wherein:—

Figure 1:
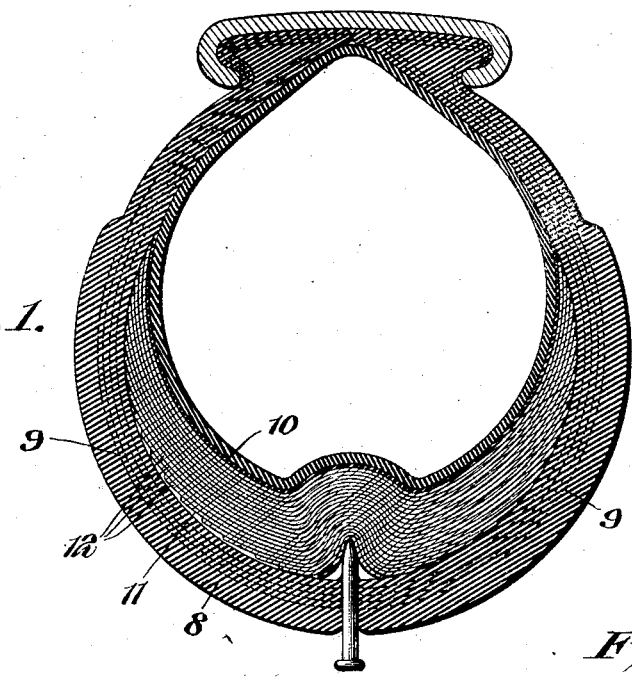
Figure 6:
Figure 2:
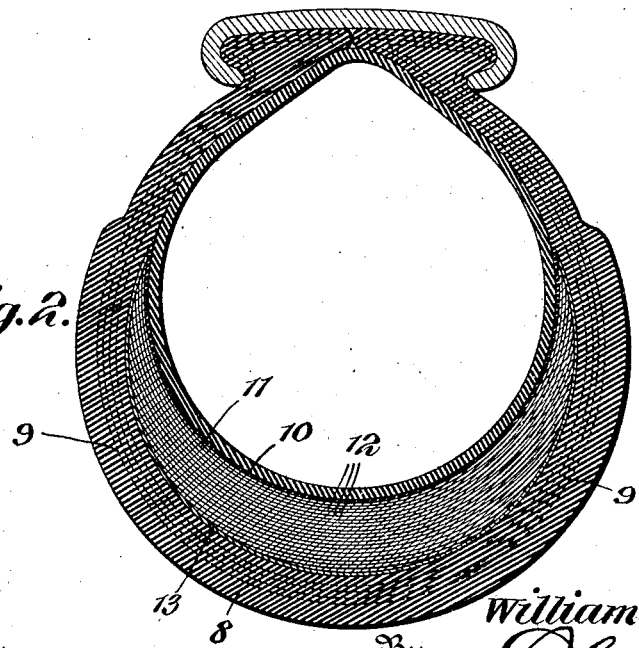
Figure 5:
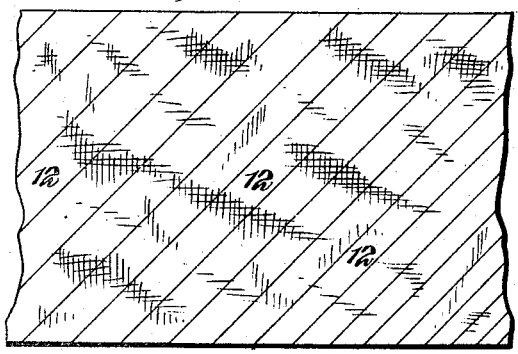
Figure 3:
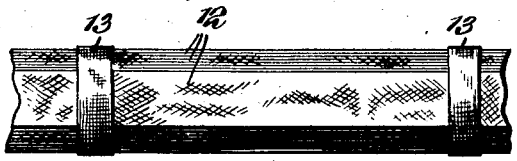
Figure 7:
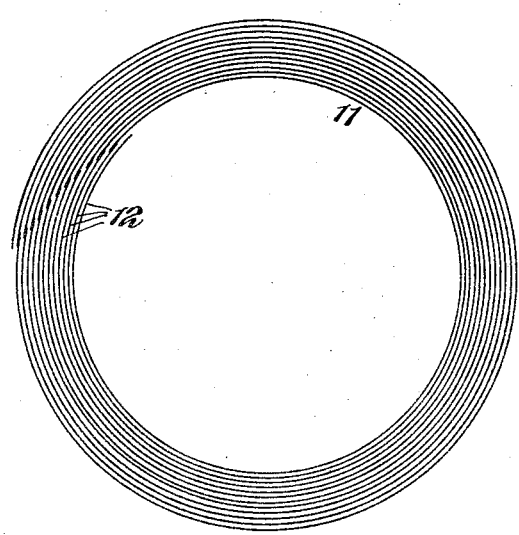
Figure 4:
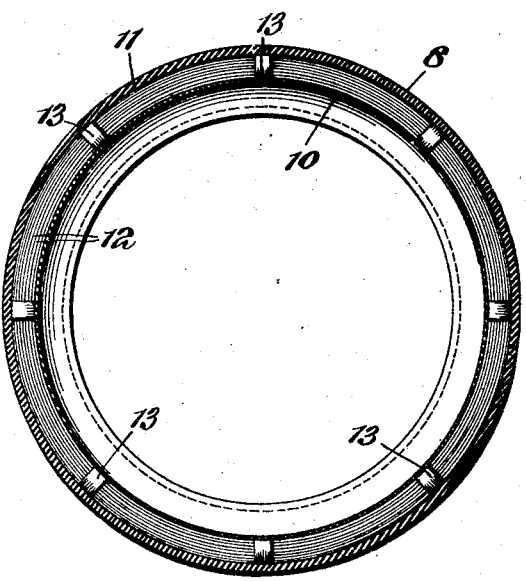

Figure 1 is a sectional view through the tire. Fig. 2 is also a sectional view through a different portion thereof. Fig. 3 is a plan view of a portion of the puncture-resisting cushion. Fig. 4 is a sectional view through the tire, showing the said cushion in side elevation. Fig. 5 is a plan view of a sheet of fabric, illustrating the manner of cutting the cushion strips. Fig. 6 is a plan view of a portion of the cushion with the sections secured together, and intermediate portions of said sections broken away in order to illustrate several. Fig. 7 is a diagrammatic view, illustrating the manner in which the cushion is formed.

Similar reference numerals designate corresponding parts in all the figures of the drawings.

In the embodiment illustrated, an outer casing 8 is employed, which may be formed in any suitable manner, and is preferably reinforced by layers of fabric 9 incorporated therein. A lining 10 of rubber is also preferably employed, the lining having its marginal portions connected to the casing, and its intermediate portions free therefrom, forming an inclosed pocket. While the lining 10 is preferably a rubber sheet, it may be formed of a layer of the casing fabric secured along its margins to the casing. Within this pocket is located a puncture-resisting cushion, designated as a whole, by the reference numeral 11. In producing this cushion, a sheet of fabric, shown in Fig. 5, is employed, and is cut upon the bias into a series of strips 12, said strips being of different widths. The strips are arranged end to end, and are cemented together, as illustrated in Fig. 6. The long strip, thus produced, is wrapped into a plurality of overlying convolutions, forming independent layers.

In the actual construction of the tire, the lining 10, whether a rubber sheet or fabric, as described, is first placed upon a form or mold, the strip is then wrapped upon the same, and the casing afterwards formed about the strip. The layers are separate from one another, and are not cemented or secured together into a single body, as is ordinarily the case, being merely attached to each other at intervals along their margins, the portions between these intervals being entirely free. Transverse binder strips 13 are secured to the margins at their points of attachment, and extend over the body of the cushion thus produced. As a result, an extremely flexible tire is provided, the cushion within the same being very mobile, and when the tire is in place, and inflated by an inner tube, this cushion is very securely maintained in position, as shown in Fig. 2. Should a nail or other sharp article pierce the harder outer casing, it will of course strike the fabric of the cushion, and the different layers thereof being very flexible because of their independence, and because of being cut upon the bias, will give freely. Therefore if the inward pressure against the said article exceeds the outward pressure of the air in the inner tube, said inner tube will merely be forced inward, as shown in Fig. 1. In this action, the first outer layers may be pierced, but the peculiar bend given to them by the article, and because of their flexibility, causes said layers to bind with great clamping force against the article and serves to add further resistance to the inward movement of the same. In fact, experience has demonstrated, that it is almost impossible to puncture a cushion composed of twelve or more layers associated as above set forth and with an air pressure of substantially eighty pounds to the square inch. At the same time, the cushion effectively binds the inner tube entirely independent of the outer casing portion, and thus if said casing portion is cut, the fabric layers will not only protect the inner tube, but will still confine the same and prevent the so-called "blow-outs", of such common occurrence in the heavier class of pneumatic tires.

From the foregoing, it is thought that the construction, operation, and many advantages of the herein described invention will be apparent to those skilled in the art, without further description, and it will be understood that various changes in the size, shape, proportion and minor details of construction, may be resorted to without departing from the spirit or sacrificing any of the advantages of the invention.

Having thus fully described my invention, what I claim as new, and desire to secure by Letters Patent, is:—

1. In a tire, the combination with an outer casing, of a puncture-resisting cushion located inside the same and comprising a strip wound longitudinally upon itself into a plurality of convolutions, one overlying the other, said strip consisting of sections disposed end to end, the end of one section being secured to the end of the next.

2. In a tire, the combination with an outer casing, of a puncture-resisting cushion located inside the same and comprising a strip wound longitudinally upon itself into a plurality of convolutions, one overlying the other, said strip consisting of sections successively less in width and disposed end to end, the end of one section being secured to the end of the next, and said convolutions having their adjacent faces free one from the other.

3. In a tire, the combination with an outer casing, of a puncture-resisting cushion located inside the same and comprising a plurality of independent layers of fabric laid one on the other and having their margins only secured together at intervals, the portions between said fastened parts being free from one another.

4. In a tire, the combination with an outer casing, of a puncture-resisting cushion located inside the same and comprising a plurality of independent layers of fabric laid one on the other, and spaced transverse binders extending over the strips at intervals, said binders being secured to the margins of the layers only, and having their intermediate portions free from said layers.

5. In a tire, the combination with an outer casing, of a puncture-resisting cushion located inside the same and comprising a plurality of independent layers of woven fabric laid one on the other and cut on the bias, said layers having their margins only secured together at intervals, and spaced transverse binders extending over the strips at their points of marginal attachment, said binders having their intermediate portions free from the strips.

6. In a tire, the combination with an outer casing, of a puncture resisting cushion located inside the same and comprising a strip of fabric separate from the casing and wrapped longitudinally into a plurality of layers, one overlying the other.

7. In a tire, the combination with an outer casing, of a puncture-resisting cushion located inside the same and comprising a strip of fabric wrapped longitudinally into a plurality of longitudinal overlying convolutions and comprising sections of different widths.

8. In a tire, the combination with an outer casing, of a puncture-resisting cushion located inside the same and comprising a strip of fabric cut on the bias, said strip being wrapped longitudinally into a plurality of separate overlying convolutions.

9. In a tire, the combination with an outer casing, of a puncture-resisting cushion located inside the same and comprising a strip of fabric cut on the bias, said strip being wrapped longitudinally into a plurality of separate overlying convolutions and comprising sections of different widths, each strip at one end being secured to the end of the next strip.

10. In a tire, the combination with an outer casing, of an inner lining having its margins secured to the casing and forming an interior pocket, and a puncture-resisting cushion located inside the pocket and comprising a strip of woven fabric cut upon the bias and composed of sections of different widths, said strip being wrapped longitudinally into a plurality of overlying convolutions forming independent layers, means securing the margins only of the layers together at intervals, and leaving the intermediate portions free, and binding strips connected to the margins only of the layers at their points of attachment, said strips extending transversely over the layers.

In testimony, that I claim the foregoing as my own, I have hereto affixed my signature in the presence of two witnesses.

WILLIAM IRVIN DREISBACH.

Witnesses:
CHAS. N. CLEMENT,
J. F. STRIEBY.